US011732616B2

(12) United States Patent
Porkka et al.

(10) Patent No.: US 11,732,616 B2
(45) Date of Patent: Aug. 22, 2023

(54) ARRANGEMENT FOR STORING OF ENERGY

(71) Applicant: CALEFA OY, Hollola (FI)

(72) Inventors: Antti Porkka, Hollola (FI); Petri Vuori, Hollola (FI)

(73) Assignee: CALEFA OY, Hollola (FI)

(*) Notice: Subject to any disclaimer, the term of this patent is extended or adjusted under 35 U.S.C. 154(b) by 149 days.

(21) Appl. No.: 17/435,887

(22) PCT Filed: Feb. 28, 2020

(86) PCT No.: PCT/FI2020/050128
§ 371 (c)(1),
(2) Date: Sep. 2, 2021

(87) PCT Pub. No.: WO2020/178479
PCT Pub. Date: Sep. 10, 2020

(65) Prior Publication Data
US 2022/0178276 A1 Jun. 9, 2022

(30) Foreign Application Priority Data

Mar. 5, 2019 (FI) .................................. 20195158

(51) Int. Cl.
*F01K 3/18* (2006.01)
*H02J 15/00* (2006.01)
(Continued)

(52) U.S. Cl.
CPC ............ *F01K 3/186* (2013.01); *F24D 10/00* (2013.01); *F28D 20/0056* (2013.01);
(Continued)

(58) Field of Classification Search
CPC ...... F01K 3/186; H02J 15/007; H02J 2300/20; F24D 10/00; F28D 20/0056;
(Continued)

(56) References Cited

U.S. PATENT DOCUMENTS

| 2002/0046561 A1* | 4/2002 | Bronicki | ............ F02C 3/24 60/39.182 |
| 2009/0178409 A1* | 7/2009 | Shinnar | ............ F28D 17/005 60/659 |

(Continued)

FOREIGN PATENT DOCUMENTS

| DE | 202016107499 U1 * | 4/2017 | ............ F23M 20/00 |
| EP | 3078817 A1 * | 10/2016 | |
| WO | WO-2012007068 A2 * | 1/2012 | ............ F01K 3/004 |

OTHER PUBLICATIONS

English Translation DE-202016107499-U1 (Year: 2017).*

*Primary Examiner* — Shafiq Mian
(74) *Attorney, Agent, or Firm* — Benesch, Friedlander, Coplan & Aronoff LLP

(57) ABSTRACT

An arrangement for storing energy, the arrangement comprising a heat-charging mass (4) and a heat-transfer channeling (3), the arrangement also comprising a heating member (11) adapted to heat up the heat-charging mass (4). The arrangement comprises a boiler belonging to a discarded combustion power plant and converted to a thermal energy storage (2) by at least partly filling the boiler with the heat-charging mass (4).

15 Claims, 4 Drawing Sheets

Figure 1:
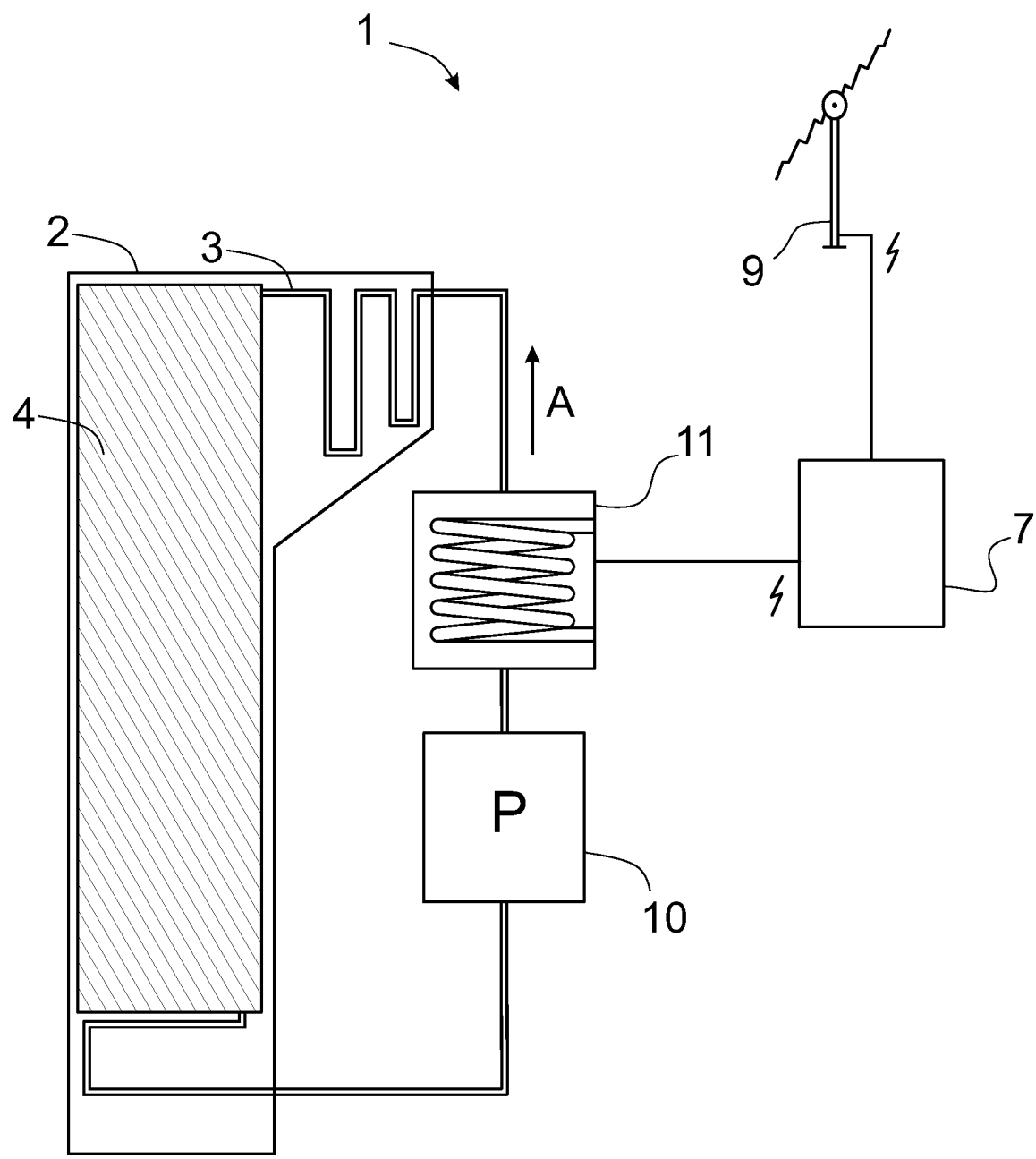

(51) Int. Cl.
  *F24D 10/00* (2022.01)
  *F28D 20/00* (2006.01)
  *F28F 11/00* (2006.01)
  *F22B 29/00* (2006.01)

(52) U.S. Cl.
  CPC ............ *F28F 11/00* (2013.01); *H02J 15/007* (2020.01); *F22B 29/00* (2013.01); *F28D 2020/0078* (2013.01); *F28F 2265/16* (2013.01); *H02J 2300/20* (2020.01)

(58) Field of Classification Search
  CPC ............... F28D 2020/0078; F28F 11/00; F28F 2265/16; F22B 29/00
  See application file for complete search history.

(56) References Cited

U.S. PATENT DOCUMENTS

| | | | |
|---|---|---|---|
| 2014/0003568 A1* | 1/2014 | Eckardt | G21C 9/004 376/316 |
| 2016/0024973 A1* | 1/2016 | Rosenfeld | F28D 20/00 60/659 |

\* cited by examiner

ARRANGEMENT FOR STORING OF ENERGY

FIELD OF THE INVENTION

The invention relates to an arrangement for storing energy as disclosed in the preamble of claim 1. In this application, the arrangement according to the invention will hereafter also be referred to as "the solution according to the invention". The solution utilizes a discarded or otherwise useless combustion power plant or the like, a boiler and an infrastructure associated therewith, as well as a grid connection.

BACKGROUND OF THE INVENTION AND PRIOR ART PROBLEMS

The low price and availability of energy have enabled our current way of life and standard of living but the energy solutions have always suffered from the problem of abuse and pollution of nature to a varying extent. Oil has been drilled from the sea bed increasingly in order to find new oil deposits while the previous ones are running dry. Drilling oil from the sea bed is expensive, and, in addition, the process involves a high risk of an environmental disaster. Disadvantages of fossil energy sources include the restricted availability thereof, environmental destruction and air pollution. Therefore, it is natural to search for novel, less polluting and renewable energy production solutions. As known, these less polluting and renewable solutions include wind and solar power, for example. However, they both suffer from the problem of being dependent on the weather conditions and susceptible to huge variations in the amount of energy produced. The electricity produced by wind mills has been made competitive with other energy production methods by introducing new large wind mills. Therefore, the portion of wind energy will, assumingly, increase in many countries, which, in turn, results in a need of load following.

Coal is extracted from the earth in vast mines, with a detrimental effect on the environment. Burning coal causes considerable carbon dioxide emissions which clearly are largely to blame for the climate change. Therefore, many countries are shutting down a large number of their coal power plants. Coal power plants and boiler power plants usually have a major infrastructure associated therewith, which possibly is economically profitable, by means of the present invention, also after the shutdown of the plant.

There is a high variation in the production of wind power, causing its price to vary as well, partly because the number of noteworthy electricity reserves in use still remains low. As the energy production is increasingly moving towards renewable solar, wave and wind power, even higher variations in the price of electricity can be expected. The solution according to the invention allows electrical energy to be stored in the form of thermal energy, when the production of electricity exceeds the consumption of energy, and allows the stored electricity to be discharged when the consumption of electricity is high. The introduction of the solutions according to the invention have a balancing effect on the price of electricity by allowing any extra production to be stored more efficiently and to be consumed when the demand is high.

The solutions according to US 2016024973 A1 and JP 2000274979 for storing energy are examples of the known prior art. However, these solutions, unlike the solution according the invention, do not utilize a discarded boiler for storing energy.

OBJECTIVE OF THE INVENTION

This invention aims at providing an arrangement that makes it possible to level a difference between the production of electricity and the consumption of electricity. This invention allows energy to be stored during low consumption and to discharge it, in the form of electricity, during low consumption.

The solution according to the invention repurposes a coal power plant, or some other power plant comprising a boiler, from an energy-producing power plant to a power plant storing thermal energy, to a load-following power plant.

The arrangement according to the invention is characterized in what is set forth in the preamble of claim 1. Other embodiments of the invention are characterized in what is set forth in the rest of the claims.

BRIEF DESCRIPTION OF THE INVENTION

The arrangement according to the invention stores and releases energy from a thermal energy storage (TES) converted from a boiler of a discarded power plant, by utilizing an existing boiler and infrastructure of the power plant, including, inter alia, an energy production equipment with a heat-transfer channeling, turbine and electrical generator. The discarded boiler is converted to a thermal energy storage by filling it with an appropriate material capable of storing a sufficient amount of energy in the form of heat.

ADVANTAGES OF THE INVENTION

An advantage of the solution according to the invention is that it is inexpensive, simple and allows a boiler of a discarded power plant, and the power plant, to be quickly converted and repurposed to a thermal energy storage (TES) and to a load-following power plant, respectively. The invention allows for the utilization of the infrastructure of the discarded power plant, making it unnecessary to disassemble the power plant or the infrastructure thereof once it has been discarded. Another advantage is that the solution according to the invention allows recycled concrete or the like to be used as the filling material of the boiler, for storing heat. This solution according to the invention utilizes, where applicable and necessary, an existing heat-transfer channeling of the boiler, thus avoiding to construct a new heat-transfer channeling, that is, a medium-circulating pipework, for the new thermal energy storage. The filling material supports and seals the heat-transfer channeling of the boiler, which possibly is at the end of its service life, thus allowing it to be used longer. Another advantage is that the heat-charging mass of the thermal energy storage can be charged, when there is an oversupply in the production of electricity, by heating a medium that heats up the mass, by means of electricity. Another advantage is that the electrical energy for heating up the chargeable mass can be produced by renewable energy sources, such as wind, solar or wave energy, or by hydropower as well.

LIST OF FIGURES

Figure 2:
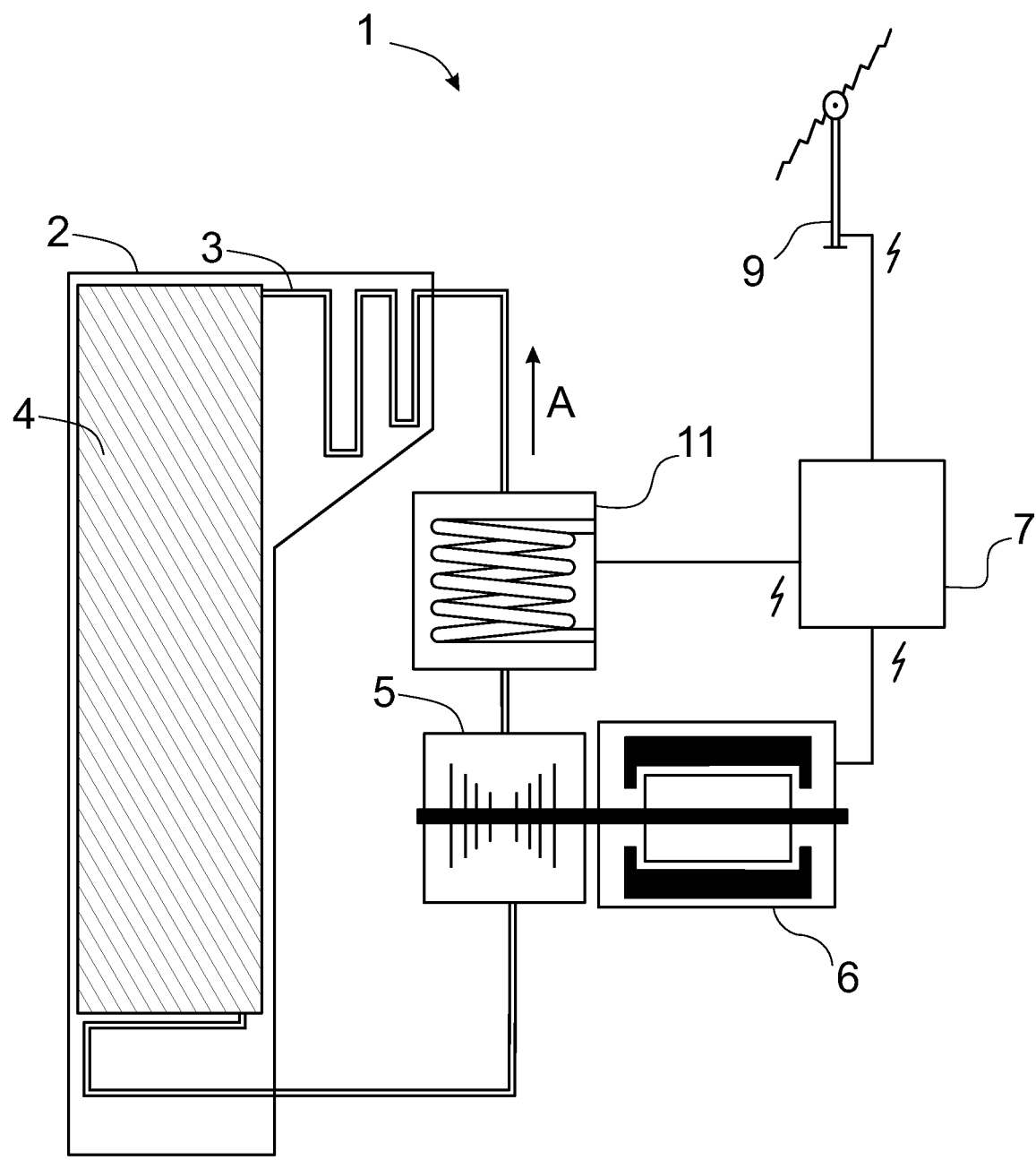
Figure 3:
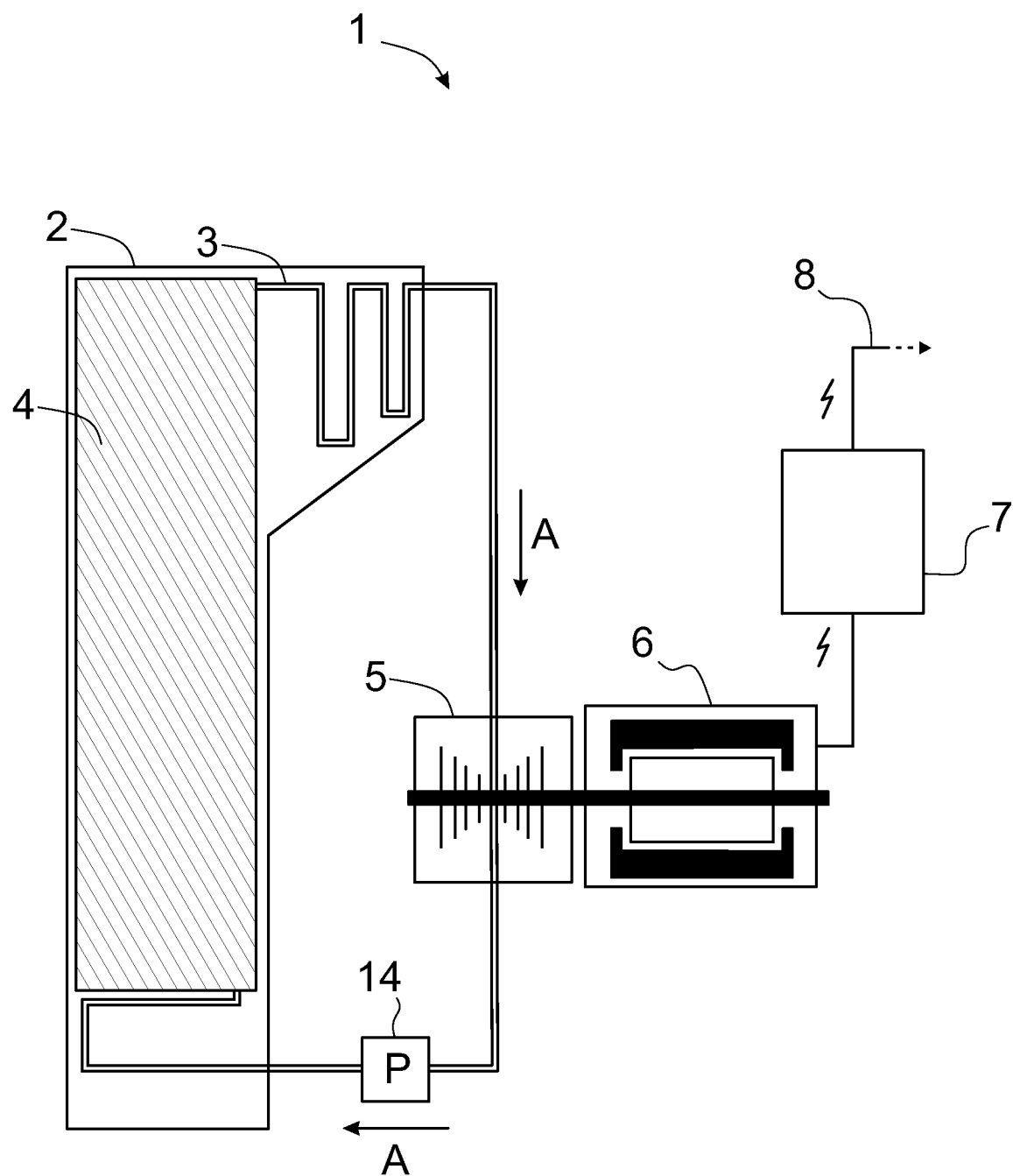
Figure 4:
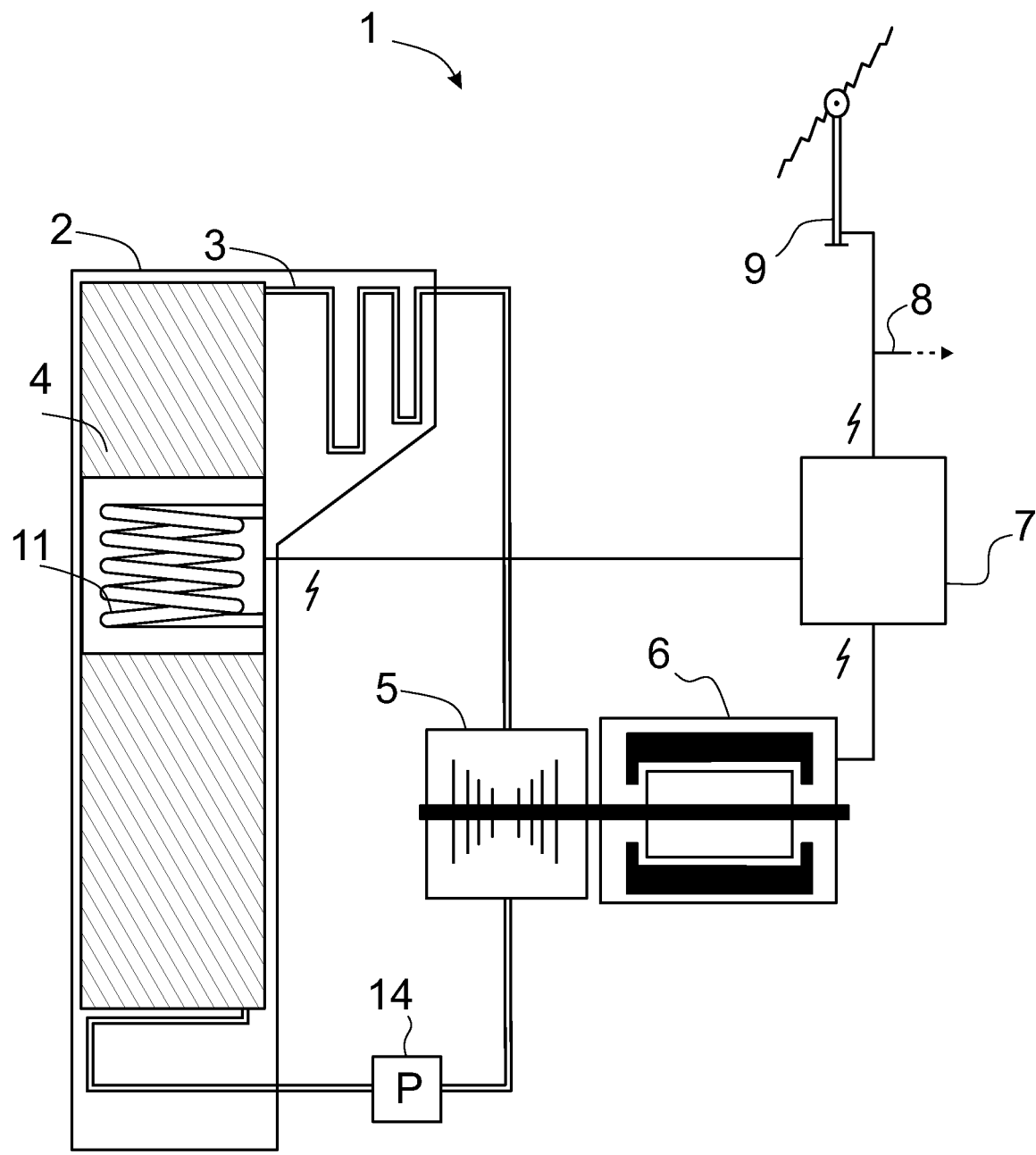

In the following, the invention will be explained in detail by means of two exemplifying embodiments, with reference to the accompanying drawings where FIG. 1 is a schematic view of an operation state of the arrangement according to the invention, while the thermal energy storage is being charged, FIG. 2 is a schematic view of a second operation state of the arrangement according to the invention, while the thermal energy storage is being charged, FIG. 3 is a schematic view of a third operation state of the arrangement according to the invention, while the thermal energy storage is being discharged, and FIG. 4 is a schematic view of another alternative embodiment of the arrangement according to the invention.

DETAILED DESCRIPTION OF THE INVENTION

FIG. 1 is a schematic and simplified view of an operation state of the arrangement according to the invention in a load-following power plant 1, converted from a discarded power plant, such as a coal power plant. The load-following power plant 1 according to the invention comprises a thermal energy storage 2, a heat-transfer channeling 3, which preferably is a pipework forming a closed circulation circuit, a thermal energy charging, i.e. storing mass 4, a feeder pump 10 and a heating member 11, such as a heating resistor. A boiler of a discarded combustion power plant, at least partly, preferably almost entirely filled with a thermal energy charging mass 4, preferably constituted by recycled concrete, for example, is used as the thermal energy storage 2. Preferably, the charging mass 4 is provided at least on the heat-transfer surfaces of the discarded boiler.

In the situation shown in FIG. 1, the thermal energy storage 2 is charged, by means of a medium, with electrical energy from a renewable energy source 9. In this exemplifying embodiment, the energy source 9 is a wind mill. In this exemplifying embodiment, the energy source 9, that is the wind mill, is connected to the load-following power plant 1 by a grid connection 7. In this step of charging the thermal energy storage 2, the feeder pump 10 is adapted to feed a medium, which, in this case, is water, to the heating member 11. The heating member 11 is adapted to heat the medium and the heated medium is adapted to be partly led to the heat-transfer channeling 3 within the thermal energy storage 2 for heating up the mass 4 provided inside the thermal energy storage 2. The effect of the heating member 11 is adapted to be adjustable.

At this stage of the charging, the water is vaporized by the heating member 11 and the vapor is transferred, along the heat-transfer channeling 3, to the thermal energy storage 2, in the direction denoted by the arrow A. The vapor releases thermal energy to the heat-charging mass 4, via the heat-transfer surfaces of the heat-transfer channeling 3, causing the mass 4 to heat up, and the temperature of the vapor to drop with the result that is condenses back into water. Thereafter, the condensed water is adapted to be pumped to the heating member 11 by the feeder pump 10. The above-mentioned process is repeated until the mass 4 is so hot that the temperature difference between the mass 4 and the vapor is not high enough to cause a phase change in the vapor, resulting in that the vapor no longer condenses into water. At this stage, the charging process proceeds to the next step.

FIG. 2 shows the next step of charging the thermal energy storage 2. The thermal energy storage 2 is still being charged, by means of the medium, with electrical energy from the renewable energy source 9. The load-following power plant 1 comprises, in addition to the components shown in FIG. 1, a turbine 5 and an electrical apparatus 6, which in the case shown in FIG. 2, acts as an electric motor.

In this step of charging the thermal energy storage 2, the turbine 5 is adapted to supply the medium, which at this stage is vapor, to the heating member 11. The heating member 11 is adapted to heat the medium and the heated medium is adapted to be partly led into the heat-transfer channeling 3 within the thermal energy storage 2 for heating up the mass 4 provided inside the thermal energy storage 2.

At this stage of the charging, the heating member 11 is adapted to heat the vapor which is adapted to be transferred, along the heat-transfer channeling 3, to the thermal energy storage 2, in the direction denoted by the arrow A. The vapor releases thermal energy to the heat-charging mass 4, via the heat-transfer surfaces of the heat-transfer channeling 3, causing the mass 4 to heat up and the temperature of the vapor to drop.

Thereafter, the vapor is adapted to be re-directed to the heating member 11 by means of the turbine 5 driven by the electrical apparatus acting as an electrical motor. The above-mentioned process is repeated until the capacity of the system is reached. This refers, for example, to that the temperature of the vapor no longer heats up the chargeable mass 4.

FIG. 3 shows a step of discharging the thermal energy storage 2. The thermal energy storage 2 is discharged by means of a medium in order to produce electricity for an electrical grid 8. The load-following power plant 1 comprises, in addition to the components shown in FIGS. 1 and 2, a feeder pump 14 and an electrical apparatus 6 acting as an electrical generator. The feeder pump 14 is adapted to feed the medium to the heat-transfer channeling 3 partly provided within the thermal energy storage 2, in the direction denoted by the arrow A. In this exemplifying embodiment, the medium is water. The energy stored in the mass 4 heats up and vaporizes the water which releases the energy received from the mass 4 in the turbine 5, in the form of a rotational movement. The electrical generator coupled to the shaft of the turbine 5 is adapted to convert the rotational movement into electricity and to supply the electricity that is has produced, through the grid connection 7, to the electrical grid 8.

The heat-transfer channeling 3, the turbine 5 and the electrical generator form part of the infrastructure of a discarded combustion power plant.

FIG. 4 shows another embodiment of the arrangement according to the invention. In this exemplifying embodiment, the heating member 11 is at least partly provided within the heat-charging mass 4 and the heating member 11 is at least partly in contact with the heat-transfer channeling 3. Thus, the mass 4 is adapted to be charged directly, without a medium, by means of heating resistors 11.

The thermal energy of the mass 4 is adapted to the discharged, at a desired time, as electrical energy, into the electrical grid 8, by means of the medium, turbine 5 and electrical generator. The discharging is adapted to be carried out in the substantially same manner as explained in the description of FIG. 3.

It will be appreciated by a person skilled in the art that the invention is not solely restricted to the above-described examples but may vary within the scope of the accompanying claims. Thus, some of the structural solutions may differ from the ones disclosed above, and the mass may comprise some other material than concrete. Preferably, it can be any material having a high heat-charging capacity and easily depositable into the boiler and on the heat-transfer surfaces thereof, by casting or in some other way.

It will also be appreciated by the person skilled in the art that the arrangement may include, in addition to those disclosed above, other parts, such as condenser, which, at the stage of discharging thermal energy, is adapted to cool the medium, if necessary. Further, the arrangement may include, for instance, means of adjusting the medium when necessary.

It will also be appreciated by the person skilled in the art that the electrical motor driving the turbine and the electrical generator can be constituted by a single electrical apparatus, or, alternatively, they can be separate apparatuses.

It will also be appreciated by the person skilled in the art that the thermal energy storage can be charged with electricity from some other energy source than a wind mill, such as with solar or wave energy, or with hydropower as well.

It will also be appreciated by the person skilled in the art that the medium heated by means of the thermal energy storage can be adapted to be led to a district heating grid where the medium is adapted to release its energy for heating buildings, for example, or the vapor heated by means of the thermal energy storage can be adapted to be delivered for process use.

The invention claimed is:

1. An arrangement for storing energy, the arrangement comprising a heat-charging mass (4) and a heat-transfer channeling (3), the arrangement also comprising a heating member (11) adapted to heat up the heat-charging mass (4), characterized in that the arrangement comprises a boiler belonging to a discarded combustion power plant and converted to a thermal energy storage (2) by at least partly filling the boiler with the heat-charging mass (4).

2. An arrangement as defined in claim 1, characterized in that the heat-charging mass 4 is constituted by concrete, preferably recycled concrete, and that the heat-charging mass 4 is deposited at least on the heat-transfer surfaces of the discarded boiler.

3. An arrangement as defined in claim 1, characterized in that a part of the heat-transfer channeling (3) is located within heat-charging mass (4).

4. An arrangement as defined in claim 1, characterized in that the arrangement comprises a heating member (11) for heating up the heat-charging mass (4).

5. An arrangement as defined in claim 4, characterized in that the heating member (11) is connected to the heat-transfer channeling (3) for transferring heat to the heat-charging mass (4) by means of a medium.

6. An arrangement as defined in claim 4, characterized in that the heating member (11) is at least partly provided within the heat-charging mass (4).

7. An arrangement as defined in claim 1, characterized in that the heat-charging mass (4) is adapted to be heated up by electrical energy.

8. An arrangement as defined in claim 7, characterized in that the electrical energy used for heating up the heat-charging mass (4) preferably is electricity produced by means of renewable energy.

9. An arrangement as defined in claim 1, characterized in that the thermal energy contained in the thermal energy storage (2) is adapted to be discharged to the heat-transfer channeling (3) by means of a circulating medium and to be transferred for use as energy elsewhere.

10. An arrangement as defined in claim 1, characterized in that the thermal energy storage (2) is adapted to act as an energy source as the medium is heated up by the heat-charging mass (4) provided within the thermal energy storage (2).

11. An arrangement as defined in claim 1, characterized in that the arrangement comprises a turbine (5), and that the medium is heated up by the thermal energy storage (2) is adapted to be led to the turbine (5) where the energy of the medium is adapted to be converted to kinetic energy.

12. An arrangement as defined in claim 11, characterized in that the arrangement comprises an electrical apparatus (6) acting as an electrical generator and connected to the turbine (5), and that the kinetic energy produced by the turbine (5) is adapted to the converted, by means of the electrical generator, to electrical energy which preferably can be transferred, through a grid connection (7), to an electrical grid (8).

13. An arrangement as defined in claim 12, characterized in that the heat-transfer channeling (3), the turbine (5) and the electrical generator form part of the infrastructure of a discarded combustion power plant.

14. An arrangement as defined in claim 1, characterized in that the medium heated up by the thermal energy storage (2) is adapted to be led to a district heating grid where the medium is adapted to release its energy for heating buildings.

15. An arrangement as defined in claim 1, characterized in that the vapor heated up by the thermal energy storage (2) is adapted to be delivered for process use.

\* \* \* \* \*